(12) United States Patent
Sams

(10) Patent No.: US 8,533,615 B1
(45) Date of Patent: Sep. 10, 2013

(54) SYSTEMS AND METHODS FOR ORDER-INDEPENDENT RENDERING OF GRAPHICAL OBJECTS USING OPERATING SYSTEM RESOURCES

(71) Applicant: Rudy Jason Sams, San Jose, CA (US)

(72) Inventor: Rudy Jason Sams, San Jose, CA (US)

(73) Assignee: Google, Inc., Mountain View, CA (US)

( * ) Notice: Subject to any disclaimer, the term of this patent is extended or adjusted under 35 U.S.C. 154(b) by 0 days.

(21) Appl. No.: 13/631,259

(22) Filed: Sep. 28, 2012

Related U.S. Application Data

(60) Provisional application No. 61/656,245, filed on Jun. 6, 2012.

(51) Int. Cl.
*G06F 3/00* (2006.01)
(52) U.S. Cl.
USPC ............ 715/762; 715/716; 715/763; 715/764
(58) Field of Classification Search
USPC ......................................... 715/716, 762–764
See application file for complete search history.

(56) References Cited

U.S. PATENT DOCUMENTS

| | | | | |
|---|---|---|---|---|
| 2009/0021513 | A1* | 1/2009 | Joshi et al. | 345/419 |
| 2011/0279446 | A1* | 11/2011 | Castro et al. | 345/419 |
| 2011/0283223 | A1* | 11/2011 | Vaittinen et al. | 715/781 |
| 2012/0260267 | A1* | 10/2012 | Cucu et al. | 719/328 |

* cited by examiner

*Primary Examiner* — Tadeese Hailu
(74) *Attorney, Agent, or Firm* — MH2 Technology Law Group, LLP

(57) ABSTRACT

Embodiments relate to systems and methods for order-independent rendering of graphical objects using operating system resources. In implementations, an application programming interface (API) can be provided in the operating system of a mobile or other device. The API can comprise a set of both compute and graphical processing resources, and can accept calls from applications or other requestors to render graphical objects to compose a scene. The set of compute resources can assign, access, and/or sort a set of tag information attached to each graphical element. That information can encode features such as distance from a viewpoint, transparency, and others. Applications requesting the rendering of a scene can access the compute resources via the API to sort the graphics objects according to their tag information, such as closest to farthest from a viewpoint. Applications are relieved of separately determining an order for rendering the objects of a scene.

20 Claims, 5 Drawing Sheets

SYSTEMS AND METHODS FOR ORDER-INDEPENDENT RENDERING OF GRAPHICAL OBJECTS USING OPERATING SYSTEM RESOURCES

CROSS REFERENCE TO RELATED APPLICATIONS

This application claims priority to U.S. Provisional Application No. 61/656,245, filed Jun. 6, 2012, entitled "Systems and Methods for Order-Independent Rendering of Graphical Objects Using Operating System Resources," by the same inventor herein, assigned or under obligation of assignment to the same entity as this application, and which application is incorporated herein in its entirety.

FIELD

The present teachings relate to systems and methods for order-independent rendering of graphical objects using operating system resources, and more particularly, to platforms and techniques for sending graphics rendering tasks to a set of computation resources via an application programming interface (API), and automatically generating a rendering or presentation order for individual graphical objects based on a set of tag information associated with those objects.

BACKGROUND

In the operating system field, the application programming interfaces of various operating system families have incorporated calls or interfaces to a variety of graphics routines. The APIs of known operating systems, such as desktop operating systems or mobile device systems, for instance allow applications operating under those operating systems to call certain shading, rendering, shape-adjusting, motion-related, and/or other processing routines to supply results to those applications.

In existing API implementations, however, an application which wishes to render a scene containing a number of graphics objects may need to explicitly order those objects before rendering and presentation to the user via a display. For instance, a computer-based game or simulation which depicts a large flock of birds may need to determine which individual bird, as a graphical element, needs to be generated, rendered, and/or presented first, second, third, and so forth to create a desired visual effect, such as the motion of the flock across the screen or others. While known APIs can accept calls to produce those individual graphical objects, it may be the responsibility of the calling application, such as gaming software, to compute and arrange those objects in the desired order in the scene. In implementations, this can be due to the fact that graphical resources exposed by the APIs in existing operating systems may be single-threaded. The depicted birds or other objects of the scene can be arranged, for example, based on the distance of the objects from a viewpoint in the scene. The viewpoint can, for instance, reflect the vantage point of a player in a game, or other user. However, when the set of graphical objects of a scene are large or under other conditions, the necessity to compute the order of the objects can represent a significant computational burden on the application. The need to generate and order graphical objects via the (typically single-threaded) API can affect the performance of the application, and detract from the resulting user experience.

It may be desirable to provide methods and systems for order-independent rendering of graphical objects using operating system resources, in which the API of an operating system can provide both computational and graphical resources to applications running under that operating system, and automatically generate an ordering of graphical objects on the API side.

DESCRIPTION OF DRAWINGS

The accompanying drawings, which are incorporated in and constitute a part of this specification, illustrate implementations of the present teachings and together with the description, serve to explain the principles of the present teachings. In the figures.

DESCRIPTION OF EMBODIMENTS

Embodiments of the present teachings relate to systems and methods for order-independent rendering of graphical objects using operating system resources. More particularly, embodiments relate to platforms and techniques for providing computational and graphical resources via the application programming interface (API) of an operating system which permits calling applications to request the generation of a scene using a set of graphical objects, the generation or rendering of which can be parallelized using native API resources. According to implementations, the order in which the finished graphical objects can be generated or rendered can be determined and potentially enhanced or optimized by the compute resources, without any necessary intervention on the part of the calling application.

Reference will now be made in detail to exemplary embodiments of the present teachings, which are illustrated in the accompanying drawings. Where possible the same reference numbers will be used throughout the drawings to refer to the same or like parts.

Figure 1:
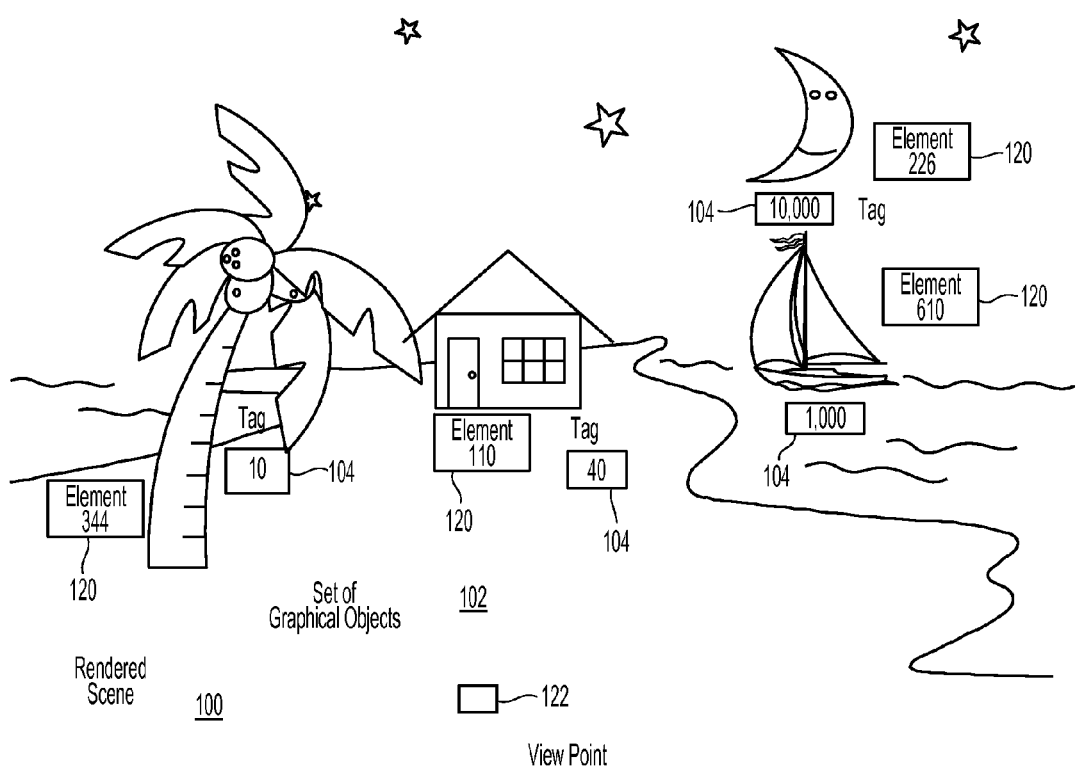
FIG. 1 illustrates an illustrative overall rendered scene which can be processed using systems and methods for order-independent rendering of graphical objects using operating system resources, according to various implementations.

FIG. 1 illustrates a rendered scene 100 which systems and methods for order-independent rendering of graphical objects using operating system resources can operate to process, generate, or produce a rendered scene 100, according to implementations. In implementations as shown, the rendered scene 100 can comprise a number of components, including a set of graphical objects 102. In implementations, each element of the set of graphical objects 102 can be or include one or more graphical objects, representations, features, elements, sections, and/or other graphical entities. In implementations, each element in the set of graphical objects 102 can be or include one or more discrete objects, and/or can be or include other graphical primitives or areas. In implementations, the rendered scene 100 can be or include one or more types of graphical scene or depiction, such as, for example, a digital still photograph and/or other image, an animation frame, a video frame, and/or other graphical presentation or output. In implementations, the rendered scene 100 can consist of or contain a set of graphical objects 102 and be stored and/or encoded as a data file, such as, for example, a file encoded in the JPG, GIF, TIFF, MPG, Windows™ Media™ file, and/or other format or standard.

In implementations, as shown each graphical element in the set of graphical objects 102 can have associated attributes and/or other information, attached to that element. In implementations, that information can be or include, for instance, an element ID 120, such as a number, address, pixel location, and/or other identifier. In implementations, the information attached to each graphical element in the set of graphical objects 102 can likewise include a set of tag information 104. The set of tag information 104 of each element in the set of graphical objects 102 can be or include, for example, an indication of the distance of the graphical element in the rendered scene 100, as measured from a viewpoint 122 and/or other point of reference. In implementations, the viewpoint 122 can represent the focal point from which a user perceives the field of view of the rendered scene 100, and/or can represent or be placed in other positions in the rendered scene 100. In implementations, the rendered scene 100 can therefore be accessed, generated, rendered, and/or otherwise presented from a coherent vantage point, from the point of view of the user viewing that scene or otherwise. According to implementations, and as for instance illustrated in FIG. 2, the rendered scene 100 can be generated and/or output by or via a device 118, such as a laptop and/or desktop computer, a cellular phone or smart phone, a personal digital assistant, a tablet computer, and/or other wired or wireless, networked and/or standalone device, machine, or platform. In implementations, the rendered scene can be presented by the device 118 on a display 126, such as an LCD and/or other display device or media. According to implementations, the device 118 can operate under the control and management of an operating system 106. The operating system 106 can be or include, for instance, an operating system designed to be installed on a mobile device.

According to implementations, a set of applications 108 can be stored, hosted, and/or run on the device 118 under control of the operating system 106. The set of applications 108 can be or include, for example, messaging applications, media playback applications, gaming software, and/or other software or applications. In regards, any application or applications in the set of applications 108 can generate one or more workloads 124, which can consist of or contain the set of graphical objects 102 from which the rendered scene 100 is, or will be, composed. According to implementations, the set of applications 108 can interface to the operating system 106 via an application programming interface (API) 110, through which any of the applications in the set of applications 108 can call on routines, services, file access services, hardware support, and/or other resources or services managed or mediated by the operating system 106. In implementations, the application programming interface (API) 110 can provide an interface to multiple sets or classes of resources available on or through the device 118, such as, as illustrated a set of compute resources 112 and a set of graphical resources 114. According to implementations, the application programming interface (API) 110 can incorporate, or can be associated with, resources such as the Renderscript™ services incorporated in the operating system 108. In implementations, the set of compute resources 112 and/or the set of graphical resources 114 can be exposed or made available to calling applications, in parallelized form, so that multiple graphical objects and/or other objects can be sent to those resources at one time or in one call.

In implementations, the set of compute resources 112 can be or include resources or services such as, for example, computational routines, sorting routines, floating point computational routines or resources, cache memory or other storage resources, and/or other computationally-related routines, services, and/or resources.

In implementations, the set of graphical resources 114 can be or include resources or services such as, for instance, transform and lighting (T&L) processing or effects, shading processing or effects, transparency processing or effects, vertex-based processing or effects, motion-related processing or effects, vector-related processing or effects, raster operations (ROPs), and/or other graphically-related computations, processing, or effects. According to implementations, an application in the set of application 108 can call on any one or more resources in the set of compute resources 112 and the set of graphical resources 114, to generate and output the rendered scene 100 and/or other graphical results.

Figure 2:
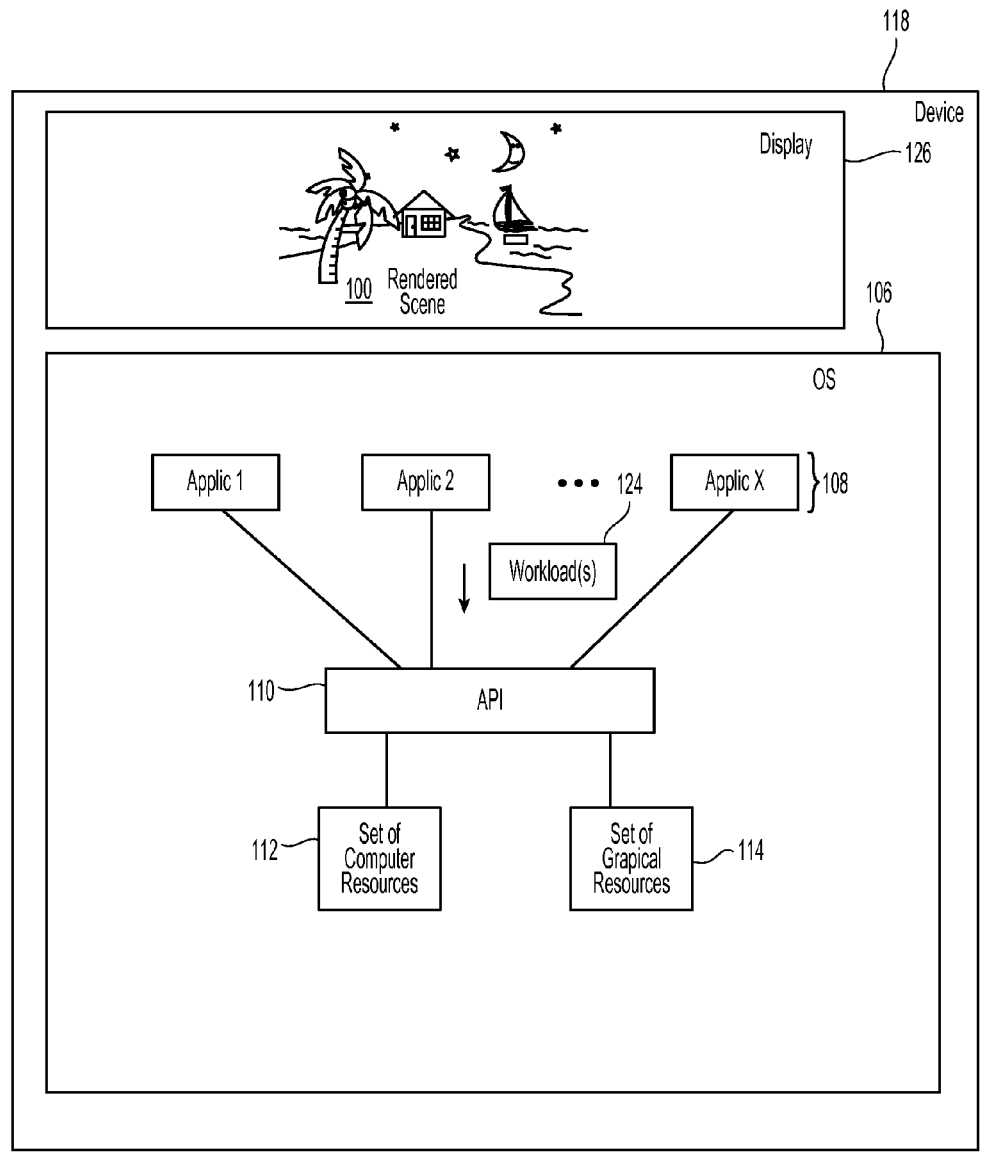
FIG. 2 illustrates a device and associated operating system and associated resources in which systems and methods for order-independent rendering of graphical objects using operating system resources can be implemented, according to various implementations.
Figure 3:
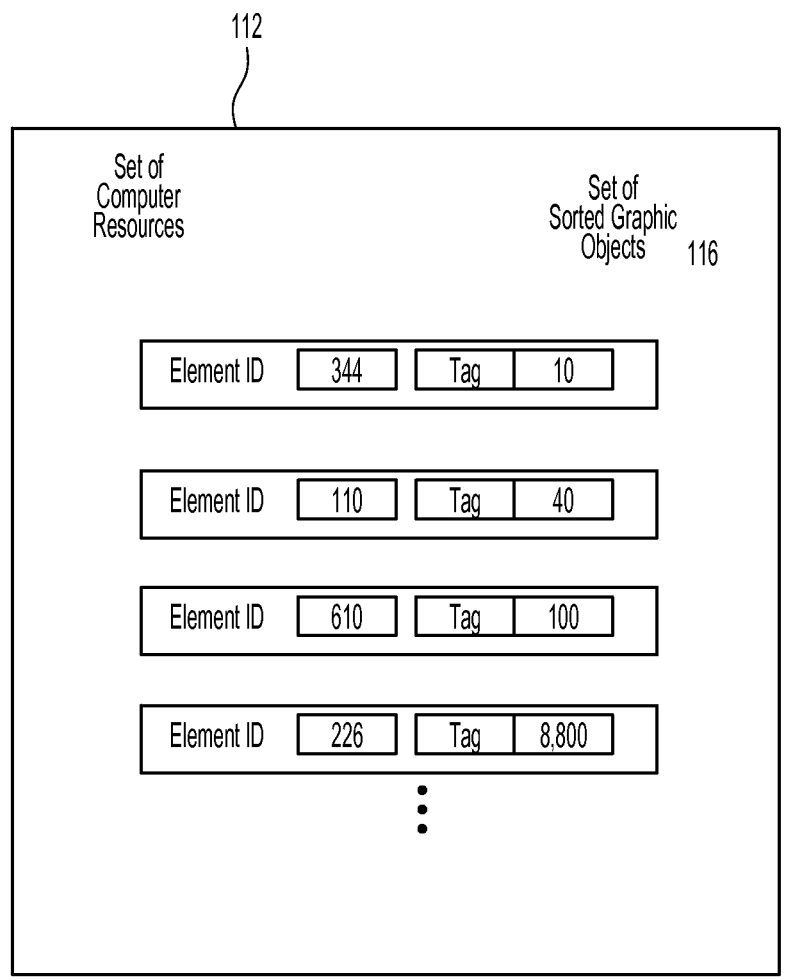
FIG. 3 illustrates a sorting operation that can be carried out in systems and methods for order-independent rendering of graphical objects using operating system resources, according to various implementations.

According to implementations, and as for instance illustrated in FIG. 2, an application in the set of applications 108 can call the set of compute resources 112 and/or other resources via the application programming interface (API) 110, to perform processing, ordering, sorting, and/or other operations on the set of graphical objects 102 which together make up the rendered scene 100, in desired ways. In implementations as shown, the calling application can access the set of compute resources 112 and identify the set of graphical objects 102 to the set of compute resources 112, for instance, by providing an address or name of an associated file, by providing an index to storage and/or a graphics array in memory, and/or using other identifiers. According to implementations, the calling application can indicate that it wishes the set of compute resources 112 to process, generate, sort, and/or render the set of graphical objects 102 in a certain order, to produce a set of sorted graphical objects 116. In implementations, the calling application can specify that the set of graphical objects 102 be sorted into an order based on their distance from the viewpoint 122 of the rendered scene 100, as reflected in the set of tag information 104 associated with each graphical element. In implementations, the calling application can for instance specify that the set of graphical objects 102 be sorted to produce the set of sorted graphical objects 116 in ascending order of their distance from the viewpoint 122, or can specify that the set of sorted graphical objects 116 be sorted or arranged in descending order of their distance from the viewpoint 122. It will be appreciated that other types of parameters, variables, metadata, and/or other information can be stored in set of tag information 104, and that the set of sorted graphical objects 116 can be sorted or ordered based on that other information, and/or using other rules, metrics, functions, and/or heuristics. For example, in implementations, the set of sorted graphical objects 116 can be sorted, ordered, and/or re-ordered based on an average color value or intensity value of the set of graphical objects 102, and/or based on other variables, features, and/or orderings. According to implementations in further regards, the generation, rendering, and/or presentation of the set of graphical objects 102 can thereby be performed in an order which is independent of the order in which those objects are originally stored, accessed, identified by the element ID 120, and/or received.

According to implementations, the set of compute resources 112 and/or other resources mediated by the application programming interface (API) 110 can return the set of sorted graphical objects 116 to the calling application, for remaining processing and presentation of the rendered scene 100. In implementations, the remaining processing and presentation of the rendered scene 100 can be carried out using the set of graphical resources 114 presented by the application programming interface (API) 110, and/or using other routines, services, and/or resources.

According to implementations, it may be noted that the delivery of the set of graphical objects 102 to the set of compute resources 112 and/or other resources can take place at different times during the execution of the calling application in the set of applications 108. According to implementations, the calling application can for instance send the task of sorting the set of graphical objects 102 to the set of compute resources 112 before the rendered scene 102 is, or needs to be, actually generated and output, so that the sorting operations that take place using the set of compute resources 112 represent a late-ordering of the graphical objects, just before the rendered scene 100 is actually output to the display device or other output. According to implementations, the calls that the calling application makes to the set of compute resources, set of graphical resources 114, and/or other resources can include a specification of the timing of the delivery of the set of sorted graphical objects 116 and/or related data or processing. In regards, the set of applications 108 can thereby be relieved of the computational overhead of generating an ordering of the set of graphical objects 102, at the application level. Responsiveness of the user experience can therefore be enhanced.

In implementations, it will additionally be appreciated that the abstraction of graphical ordering and other processing tasks to the application programming interface (API) 110 and its component resources, can produce and/or can be used to create further performance advantages. In implementations, for instance, the sorting operations and other processing performed in the set of compute resources 112, and/or other resources exposed by the application programming interface (API) 110, can be configured to be performed and/or supported by underlying hardware of the device 118, such as, for instance, general-purpose and/or dedicated processor chips of the device 118. Moreover, in implementations, the set of compute resources 112 and/or other resources mediated by the application programming interface (API) 110 can be configured to further enhance and/or optimize object ordering and rendering operations. The set of compute resources 112 can, for instance, be configured to automatically analyze the set of graphical objects 102 and determine those graphical objects or areas which, for instance, may be blocked by an intervening solid or opaque object, taking along a line of sight to the viewpoint 122, and/or otherwise. The set of compute resources 112 can, for further instance, be configured to assign the rendering or positioning of a graphical object or element to a lower priority when, for instance, that object has a high transparency value, and so will appear as a transparent or highly translucent object or element in the rendered scene 100, or may not be visible to the user at all. In implementations, an object or element can be categorized as transparent, translucent, and/or opaque, and/or other categories or states, based on the transparency value and/or other parameters. Other filters, rules, calculations, and/or sortings or orderings can be performed by the set of compute resources 112. In implementations, those filters, rules, calculations, and/or sortings or orderings can be triggered by an explicit request of the calling application in the set of applications 108, while in other implementations, those filters, rules, calculations, and/ or sortings or orderings can be automatically initiated by the set of compute resources 112, regardless of the calling application. Other interactions between the set of applications 108, application programming interface (API) 110, set of compute resources 112, set of graphical resources 114, and/or other services, routines, applications, and/or resources can be performed.

Figure 4:
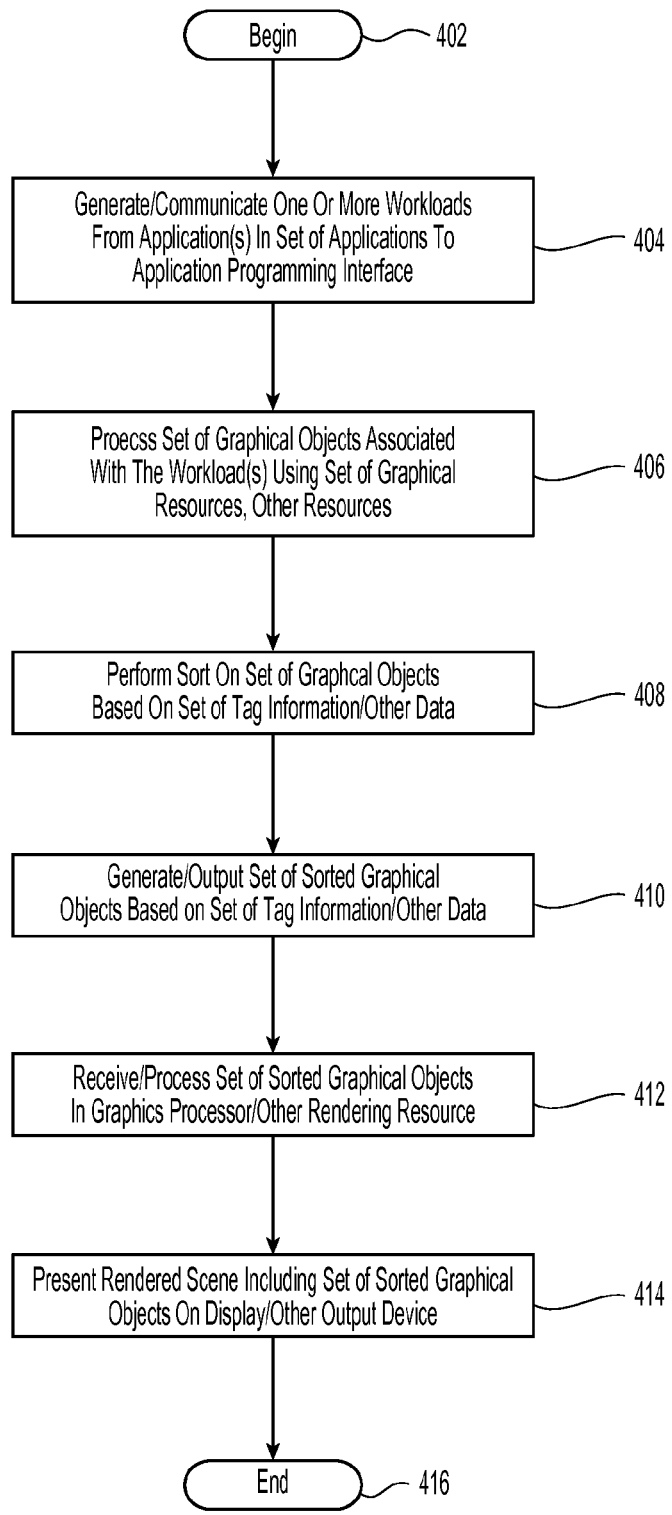
FIG. 4 illustrates a flowchart of overall graphical processing including ordering of graphical objects that can be used in order-independent rendering of graphical objects using operating system resources, according to various implementations.

FIG. 4 illustrates a flowchart of rendering, ordering, and other processing that can be performed in systems and methods for order-independent rendering of graphical objects using operating system resources, according to implementations. In 402, processing can begin. In 404, an application or application in the set of applications 108 and/or other source can generate and communicate one or more workloads 124 to the application programming interface (API) 110 of the operating system 106. In implementations, the one or more workloads 124 can comprise, contain, and/or otherwise be associated with the set of graphical objects 102, and in implementations can comprise other data or parameters. In 406, the set of graphical objects 102 associated with the one or more workloads 124 can be processed using the set of graphical resources 114 and/or other resources of the device 118. In implementations, the initial processing of the set of graphical objects can produce rendered or completed graphical objects, for example in a default order based on screen location, and/or using other rules. In 408, a sort and/or other ordering or re-ordering of the set of graphical objects 102 can be performed based on the set of tag information 104 and/or other data. In implementations, the sorting or other ordering or re-ordering can be performed by the set of compute resources 112, and/or other resources or services of the operating system 106 or otherwise.

In 410, the set of sorted graphical objects 116 can optionally be generated and/or output by the set of compute resources 112 and/or other resources or services of the operating system 106 or otherwise, based on the set of tag information 104 and/or other data. According to implementations, the set of sorted graphical objects 116 can for instance be transmitted to the graphics processor 206 and/or other hardware or other resource. In implementations, the results of 408 can be processed and/or rendered without a store and/or retrieve operation, as optional 410. In 412, the graphics processor 206 and/or other hardware or other resource can receive the set of sorted graphical objects 116. In 414, the graphics processor 206 and/or other hardware or other resources can generate the rendered scene 100 including the set of sorted graphical objects 116 on the display 126 and/or other output device. As for instance shown in FIG. 1, and merely illustratively, in a rendered scene such as one shown in that figure, the palm tree object (element 344) can be rendered and/or presented before the beach house object (element 110), which in turn can be rendered and/or presented before the sailboat object (element 610), which likewise in turn can be rendered and/or presented before the moon object (element 226). In aspects, those objects can be rendered and/or presented in order of their distance from the viewpoint 122 as reflected in the set of tag information 104 for each. But it will again be appreciated that other attributes or information can be used to generate an ordering of the set of graphical objects 102. In implementations, the set of tag information 104 can include further or additional ordering fields and/or other information besides distance values to be used to order objects, such as a render group identifier. In aspects, the objects in a scene can be grouped in render groups according to attributes such as, for instance, their status as transparent, opaque, translucent, and so forth. In implementations, different rendering groups can be assigned a higher priority based on this factor, with or without distance taken into account. For instance, objects identified as opaque can be rendered first, for example in order of near to far, followed by the transparent objects, in order of far to near. Other attributes or factors can be used as part of the set of tag information 104, and subsequent ordering.

In implementations, it will likewise be appreciated that within one rendered scene 100, groups of the set of graphical objects 102 can fall into different assigned sort groups. Thus, for instance, a scene of 20 objects may have 10 of those objects sorted far to near, while the remaining 10 objects are sorted near to far, based on the assigned groupings. In such implementations, the sorting operation can be configured to complete the sorting and/or rendering of all of one group, before the sorting and/or rendering of another group.

In 416, processing can repeat, return to a prior processing point, jump to a further processing point, or end.

Figure 5:
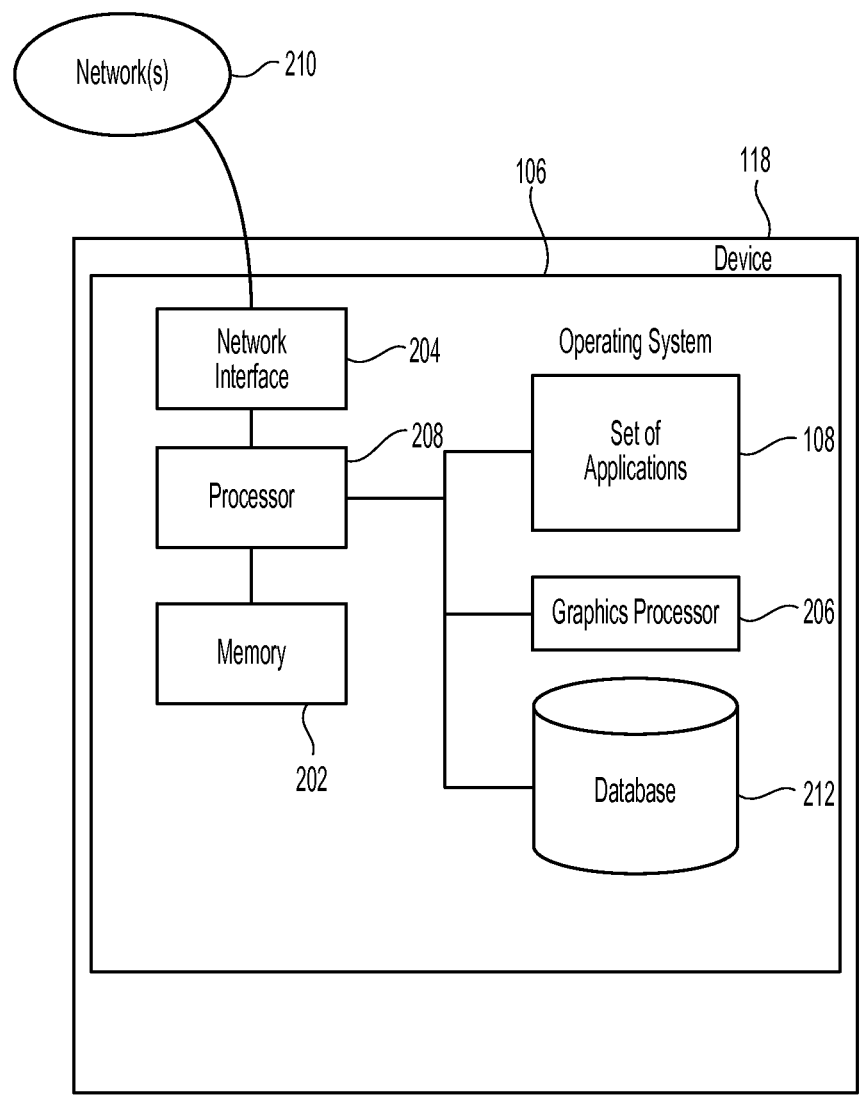
FIG. 5 illustrates exemplary hardware, software, and other resources that can be used in order-independent rendering of graphical objects using operating system resources, according to various implementations.

FIG. 5 illustrates various hardware, software, and other resources that can be incorporated in a device performing the order-independent rendering of graphical objects using operating system resources, according to embodiments. In embodiments as shown, the device 118 can comprise a platform including processor 208 communicating with memory 202, such as electronic random access memory, operating under control of or in conjunction with operating system 106. The processor 208 in embodiments can be incorporated in one or more servers, clusters, and/or other computers or hardware resources, and/or can be implemented using cloud-based resources. The operating system 106 can be, for example, an operating system designed for a mobile device. The operating system 106 can, in implementations, include other types or classes of mobile, desktop, and/or other operating systems, such as, for example, a distribution of the Linux™ operating system, the Unix™ operating system, or other open-source or proprietary operating system or platform. The processor 208 can further communicate with a network interface 204, such as an Ethernet or wireless data connection, which in turn can communicate with one or more networks 210, such as the Internet or other public or private networks. The file(s) and/or other object(s) in which the rendered scene 100 is stored or encoded can, for instance, be retrieved by the device 118 via the one or more networks 210. The processor 208 can, in general, be programmed or configured to execute control logic and control computational, graphical, and/or other operations described herein. The processor 208 can likewise communicate with the set of applications 108, as well as a graphics processor 206, and a database 212, such as a relational data store and/or other data store. In implementations, the graphics processor 206 can be or include one or more special-purpose or other processors configured to support and/or accelerate graphics operations, including features such as hardware acceleration of shading, rendering, and/or other graphics tasks. In implementations, the graphics processor 206 can include, and/or interface to, electronic memory designed to accelerate or optimize graphical processing operations. According to implementations, the set of graphical resources 114 exposed by the application programming interface (API) 110 can be of includes calls and/or other interfaces to the graphics processor 206. Other configurations of the device 118, associated network connections, and other hardware, software, and service resources are possible.

The foregoing description is illustrative, and variations in configuration and implementation may occur to persons skilled in the art. For example, while embodiments have been described in which each element of the set of graphical objects 102 has an associated set of tag information 104 which contains a distance value or metric, in implementations, the set of tag information 104 can comprise multiple variables, parameters, values, functions, and/or other information.

Similarly, while embodiments have been described in which the device 118 hosts one processor 208 and one graphics processor 206, in implementations, the device 118 can host multiple general-purpose processors, multiple graphical processors, and/or both. Other resources described as singular or integrated can in embodiments be implemented as plural or distributed, and resources described as multiple or distributed can in embodiments be combined. The scope of the present teachings is accordingly intended to be limited only by the following claims.

What is claimed is:

1. A method of processing graphical information, comprising:
   accessing a set of graphical objects to be displayed in a rendered scene;
   accessing a set of tag information associated with each graphical object in the set;
   transmitting the set of graphical objects to one or more graphical processing resources via an application programming interface (API) for sorting by the one or more graphical processing resources based on the set of tag information;
   receiving a set of sorted graphical objects based on the set of tag information that was sorted using a set of compute resources called via the API; and
   rendering the scene using the sorted set of graphical objects in sorted order.

2. The method of claim 1, wherein the set of tag information comprises at least one of a distance field, a transparency value, a field of view value, or a ray-tracing vector.

3. The method of claim 1, wherein the set of tag information comprises a transparency value, and the transparency value encodes at least one of —
   a transparent state,
   a translucent state, or
   an opaque state, for the respective graphical element.

4. The method of claim 1, wherein the set of tag information comprises an ordering field, and the sorting comprises at least one of —
   sorting the graphical objects in an ascending order, or
   sorting the graphical objects in a descending order, based on the ordering field of each of the graphical objects.

5. The method of claim 4, wherein the ordering field comprises a distance field.

6. The method of claim 5, wherein the rendering comprises at least one of —
   rendering the graphical objects in ascending order of distance, or
   rendering the graphical objects in descending order of distance.

7. The method of claim 6, wherein the distance comprises a distance from a viewpoint in the scene.

8. The method of claim 4, wherein the ordering field comprises a render group identifier.

9. The method of claim 1, wherein the scene comprises at least one of a digital still image, an animation frame, or a video frame.

10. The method of claim 1, wherein the one or more graphical processing resources comprise a set of software calls.

11. The method of claim 1, wherein the one or more graphical processing resources comprise a set of calls to a graphical processor.

12. The method of claim 1, wherein at least one of the set of compute resources or the one or more graphical processing resources can be called using a parallelized call.

13. A system, comprising:
one or more processors; and
memory storing instructions, that when executed by the one or more processors, cause the system to perform a method comprising —
accessing a set of graphical objects to displayed in a rendered,
accessing a set of tag information associated with each graphical object in the set,
transmitting the set of graphical objects to one or more graphical processing resources via an application programming interface (API) for sorting by the one or more graphical processing resources based on the set of tag information,
receiving a set of sorted graphical objects based on the set of tag information that was sorted using a set of compute resources called via the application programming interface (API), and
rendering the scene using the sorted set of graphical objects in sorted order.

14. The system of claim 13, wherein the set of tag information comprises at least one of a distance field, a transparency value, a field of view value, or a ray-tracing vector.

15. The system of claim 14, wherein the ordering field comprises a distance field.

16. The system of claim 13, wherein the set of tag information comprises a transparency value, and the transparency value encodes at least one of —
a transparent state,
a translucent state, or
an opaque state, for the respective graphical element.

17. The system of claim 16, wherein the rendering comprises at least one of —
rendering the graphical objects in ascending order of distance, or
rendering the graphical objects in descending order of distance.

18. The system of claim 13, wherein the set of tag information comprises an ordering field, and the sorting comprises at least one of —
sorting the graphical objects in an ascending order, or
sorting the graphical objects in a descending order,
based on the ordering field of each of the graphical objects.

19. The system of claim 13, wherein the one or more graphical processing resources comprise a set of calls to a graphical processor.

20. A computer readable storage medium, the computer readable storage medium comprising:
at least one instruction for causing a computer to access a set of graphical objects to be displayed in a rendered scene;
at least one instruction for causing a computer to access a set of tag information associated with each graphical object in the set;
at least one instruction for causing a computer to transmit the set of graphical objects to one or more graphical processing resources via an application programming interface (API) for sorting by the one or more graphical processing resources based on the set of tag information;
at least one instruction for causing a computer to receive a set of sorted graphical objects based on the set of tag information that was sorted using a set of compute resources called via the application programming interface (API); and
at least one instruction for causing a computer to render the scene using the sorted set of graphical objects in sorted order.

* * * * *